(12) United States Patent
Igarashi et al.

(10) Patent No.: US 10,369,997 B2
(45) Date of Patent: Aug. 6, 2019

(54) VEHICLE TRAVELING CONTROL APPARATUS

(71) Applicant: SUBARU CORPORATION, Tokyo (JP)

(72) Inventors: Shinichi Igarashi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 24 days.

(21) Appl. No.: 15/383,340

(22) Filed: Dec. 19, 2016

(65) Prior Publication Data

US 2017/0197620 A1 Jul. 13, 2017

(30) Foreign Application Priority Data

Jan. 8, 2016 (JP) .................................. 2016-002644

(51) Int. Cl.
*B60W 30/165* (2012.01)
*B60W 30/12* (2006.01)

(52) U.S. Cl.
CPC .......... *B60W 30/165* (2013.01); *B60W 30/12* (2013.01); *B60W 2710/18* (2013.01); *B60W 2710/20* (2013.01); *B60W 2750/30* (2013.01)

(58) Field of Classification Search
CPC .............. B60W 30/165; B60W 30/12; B60W 2710/18; B60W 2710/20; B60W 2750/30

(Continued)

(56) References Cited

U.S. PATENT DOCUMENTS

| 5,781,119 A * | 7/1998 | Yamashita | G05D 1/024 180/168 |
| 6,374,746 B1 * | 4/2002 | Fiske | B61B 13/08 104/138.1 |

(Continued)

FOREIGN PATENT DOCUMENTS

| JP | 2004-322916 A | 11/2004 |
| JP | 2009-202708 A | 9/2009 |

(Continued)

OTHER PUBLICATIONS

English translation of Japanese Published Patent Application No. 2009-202708 to Kudo.*

(Continued)

*Primary Examiner* — Jean Paul Cass
(74) *Attorney, Agent, or Firm* — McDermott Will & Emery LLP

(57) ABSTRACT

A vehicle traveling control apparatus for controlling following travel in which a host vehicle travels to follow a preceding vehicle traveling ahead, includes: a preceding vehicle biased travel determination unit calculating a lateral position inside a lane of the preceding vehicle, and determining whether the preceding vehicle biasedly travels while deviating from a setting range at a lane center; and a control target point setting unit setting, as a control target point of the following travel, a setting position in a vehicle width direction of the preceding vehicle in a case where it is determined that the preceding vehicle does not biasedly travel, and a position shifted as much as a predetermined shift amount from the setting position in a direction opposite to a direction in which the preceding vehicle deviates from the setting range in a case where it is determined that the preceding vehicle biasedly travels.

8 Claims, 7 Drawing Sheets

(58) Field of Classification Search
USPC .......................................................... 701/96
See application file for complete search history.

(56) References Cited

U.S. PATENT DOCUMENTS

| | | | | |
|---|---|---|---|---|
| 6,619,212 | B1* | 9/2003 | Stephan | B60L 13/006 104/290 |
| 8,496,078 | B2* | 7/2013 | Wellborn | B62D 59/04 180/14.2 |
| 10,053,089 | B2* | 8/2018 | Newman | B60W 30/045 |
| 2003/0173173 | A1* | 9/2003 | Stephan | B60L 15/005 191/10 |
| 2003/0173174 | A1* | 9/2003 | Stephan | B60L 15/005 191/10 |
| 2009/0216405 | A1 | 8/2009 | Kudo | |
| 2011/0184596 | A1* | 7/2011 | Andreasson | B61L 23/34 701/19 |
| 2014/0136095 | A1* | 5/2014 | Isogai | G01S 15/931 701/300 |
| 2014/0316305 | A1* | 10/2014 | Venkatraman | A61B 5/1112 600/595 |
| 2015/0154871 | A1* | 6/2015 | Rothoff | G08G 1/22 701/2 |
| 2015/0339927 | A1* | 11/2015 | Han | B60W 40/10 701/301 |
| 2015/0353085 | A1* | 12/2015 | Lee | B60W 30/10 701/533 |
| 2017/0344023 | A1* | 11/2017 | Laubinger | G05D 1/0272 |
| 2017/0367590 | A1* | 12/2017 | Sebe | G06K 9/00268 |
| 2018/0037227 | A1* | 2/2018 | D'sa | B60W 50/04 |
| 2018/0065633 | A1* | 3/2018 | Tamura | B60W 30/165 |
| 2018/0201264 | A1* | 7/2018 | Schoenly | B60W 30/165 |

FOREIGN PATENT DOCUMENTS

| | | |
|---|---|---|
| JP | 2015-005132 A | 1/2015 |
| JP | 2015-018447 A | 1/2015 |

OTHER PUBLICATIONS

English translation of of Japanese Published Patent Application No. 2015-018447 to Hasebe.*

English translation of Japanese Published Patent Application No. 2015-005132 to Guo filed in 2013.*

Office Action issued in corresponding Japanese Patent Application No. 2016-002644, dated Aug. 1, 2017.

* cited by examiner

VEHICLE TRAVELING CONTROL APPARATUS

CROSS-REFERENCE TO RELATED APPLICATIONS

The present application claims priority from Japanese Patent Application No. 2016-002644 filed on Jan. 8, 2016, the entire contents of which are hereby incorporated by reference.

BACKGROUND

1. Technical Field

The present invention relates to a vehicle traveling control apparatus for controlling following travel in which a host vehicle travels to follow a preceding vehicle traveling ahead.

2. Related Art

In the related art, in a vehicle such as an automobile, a following travel system in which a host vehicle travels to follow a preceding vehicle traveling ahead is known. For example, as disclosed in Japanese Unexamined Patent Application Publication No. 2004-322916, a following travel system to follow the preceding vehicle automatically controls a steering device, a transmission, an engine, and a brake by causing a radar or a camera to trace the preceding vehicle.

In general, the above-described following travel system calculates a travel locus, on the basis of a center position in a vehicle width direction which is calculated by observing a rear area of the preceding vehicle, and controls the host vehicle so that the center position in the vehicle width direction of the host vehicle coincides with the calculated travel locus.

However, if the preceding vehicle biasedly travels close to an opposite lane side or a road shoulder side, the host vehicle also biasedly travels while copying biased travel of the preceding vehicle. Therefore, in a case where a vehicle width of the preceding vehicle is smaller than a vehicle width of the host vehicle, there is a possibility that a vehicle body of a host vehicle C1 may partially protrude into lanes Lc and Ls as illustrated in FIGS. 11 and 12.

In an example illustrated in FIG. 11, a preceding vehicle C2 does not protrude into the lane Lc while traveling close to the lane Lc at the center of a road RD. However, the host vehicle C1 which follows the preceding vehicle C2 has the vehicle width larger than that of the preceding vehicle C2. Thus, the vehicle body of the host vehicle C1 partially protrudes into the lane Lc at the center of the road RD. Consequently, there is a possibility that a driver may not only feel anxiety but also worry about safety.

In addition, in an example illustrated in FIG. 12, the preceding vehicle C2 does not protrude into the lane Ls while traveling close to the lane Ls on the road shoulder side of the road RD. However, the host vehicle C1 which follows the preceding vehicle C2 has the vehicle width larger than that of the preceding vehicle C2. Thus, the vehicle body of the host vehicle C1 partially protrudes into the lane Ls on the road shoulder side. Similarly, there is a possibility that the driver may not only feel anxiety but also worry about safety.

SUMMARY OF THE INVENTION

It is desirable to provide a vehicle traveling control apparatus which can ensure safety by restraining a host vehicle from biasedly traveling to copy biased travel of a preceding vehicle when the host vehicle travels to follow the preceding vehicle, and by preventing the host vehicle from protruding from a lane.

An aspect of the present invention provides a vehicle traveling control apparatus for controlling following travel in which a host vehicle travels to follow a preceding vehicle traveling ahead. The vehicle traveling control apparatus includes a preceding vehicle biased travel determination unit that calculates a lateral position inside a lane of the preceding vehicle, and that determines whether the preceding vehicle biasedly travels while deviating from a setting range at a lane center, and a control target point setting unit that sets a setting position in a vehicle width direction of the preceding vehicle, as a control target point of the following travel, in a case where it is determined that the preceding vehicle does not biasedly travel, and that sets a position shifted as much as a predetermined shift amount from the setting position in the vehicle width direction of the preceding vehicle in a direction opposite to a direction in which the preceding vehicle deviates from the setting range, as the control target point, in a case where it is determined that the preceding vehicle biasedly travels.

DETAILED DESCRIPTION

Figure 1:
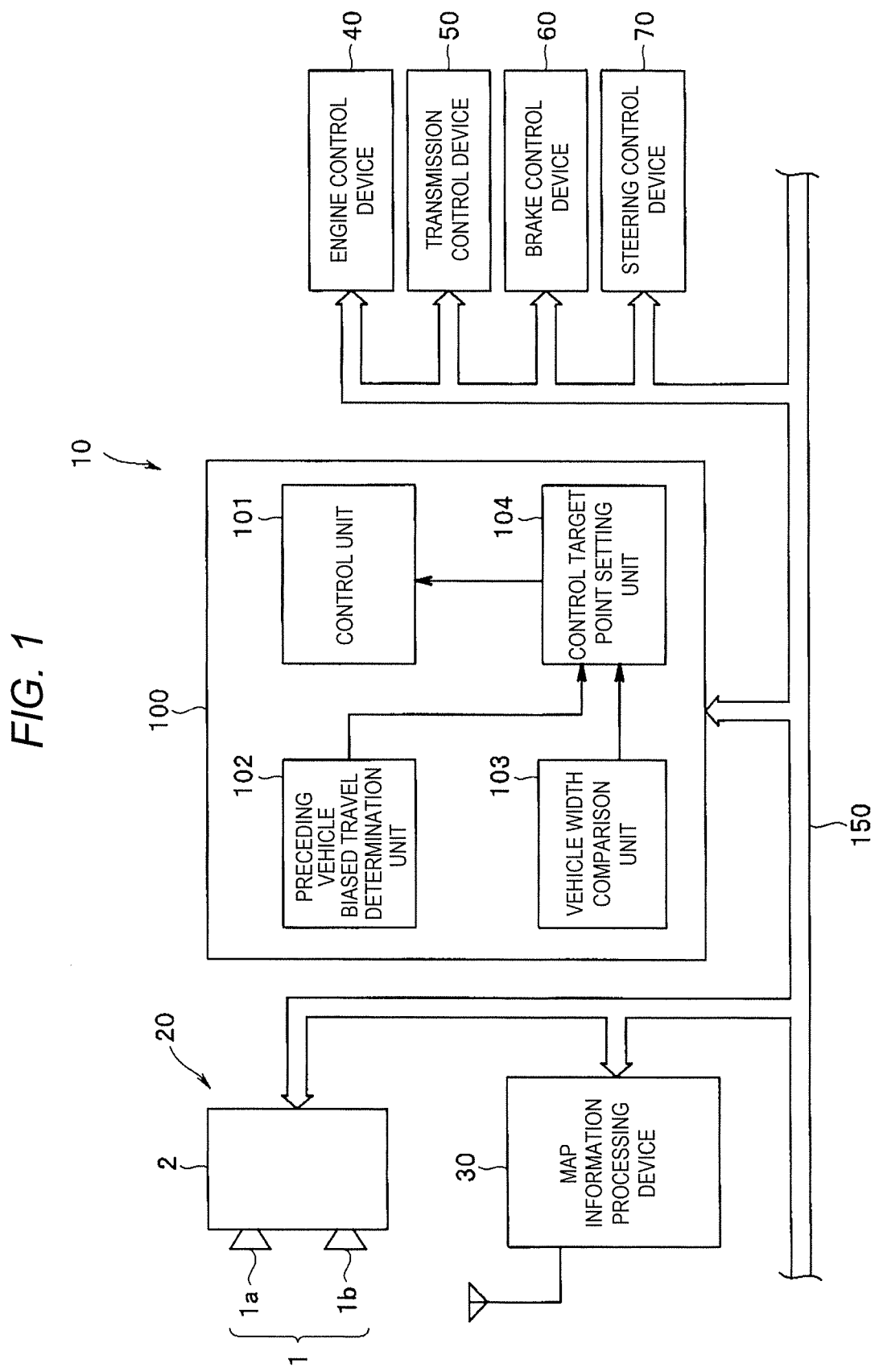
FIG. 1 is a configuration diagram of a travel control system.

Hereinafter, an example according to an aspect of the present invention will be described with reference to the drawings. In FIG. 1, the reference numeral 10 represents a travel control system of a vehicle such as an automobile, which performs travel control including autonomous automatic driving of the vehicle. The travel control system 10 adopts a configuration in which an external environment recognition device 20, a map information processing device 30, an engine control device 40, a transmission control device 50, a brake control device 60, and a steering control device 70 are coupled to each other via a communication bus 150 forming an in-vehicle network, around the traveling control apparatus 100.

The external environment recognition device 20 employs various devices such as an onboard camera, a millimeter-wave radar, and a laser radar so as to recognize an external environment around a host vehicle. In this example, a case will be mainly described in which as the external environment recognition device 20, an onboard camera 1 and an image recognition device 2 are employed so as to recognize the external environment.

In this example, the camera 1 is a stereo camera including two cameras 1a and 1b which image the same object from mutually different viewpoints, and is a shutter-synchronized camera having an imaging device such as CCD and CMOS. For example, the cameras 1a and 1b are disposed so as to have a predetermined base line length in the vicinity of an inner rear-view mirror which is located inside a front window and in an upper portion in a vehicle compartment.

A pair of right and left images captured by the camera 1 are processed by the image recognition device 2. The image recognition device 2 obtains a pixel deviation amount (parallax) at corresponding positions of the right and left images by performing a stereo matching processing, and generates a distance image by converting the pixel deviation amount to brightness data. On the basis of principles of triangulation, a point on the distance image is coordinate-transformed to a point on a real space in which a vehicle width direction of a host vehicle, that is, a lateral direction is set to an X-axis, a vehicle height direction is set to a Y-axis, and a vehicle longitudinal direction, that is, a distance direction is set to a Z-axis. In this manner, the image recognition device 2 three-dimensionally recognizes a lane line (lane), an obstacle, and a vehicle traveling ahead of the host vehicle, on a road on which the host vehicle travels.

The lane line as the lane can be recognized by extracting a point group having lane line candidates from an image and by calculating a straight line or a curve connecting candidate points thereof to each other. For example, within a lane line detection region set on the image, the image recognition device 2 detects an edge whose brightness varies to a predetermined level or higher on multiple search lines set in a horizontal direction (vehicle width direction), and detects a set of a lane line start point and a lane line end point for each search line, thereby extracting an intermediate region between the lane line start point and the lane line end point, as a lane line candidate point.

Then, the image recognition device 2 processes time series data relating to a spatial coordinate position of the lane line candidate point on the basis of a vehicle movement amount per unit time, and calculates a model which approximates to right and left lane lines, thereby recognizing the lane lines through the model. As the model which approximates to the lane lines, it is possible to use an approximate model in which straight line components obtained by performing the Hough transform are linked to each other, or an approximate model obtained using a quadratic equation curve.

The map information processing device 30 includes a map database. On the basis of a signal transmitted from a GPS satellite, the map information processing device 30 measures a position of the host vehicle, and compares the measured position with map data. The map database includes map data for guiding a travel route of a vehicle or for displaying a current position of the vehicle, and high-resolution map data for performing driving support control including automatic driving.

The map information processing device 30 presents a driver with travel route guide or traffic information based on comparison between a result of measuring the position of the host vehicle and the map data via a display device (not illustrated). The map information processing device 30 outputs travel control map information such as road shape data including a curvature, a lane width and a road shoulder width of the road on which the host vehicle and the preceding vehicle travel, a road azimuth angle, types of road lane line, and the number of lanes.

The engine control device 40 controls an operating state of an engine (not illustrated), on the basis of a signal transmitted from various sensors for detecting the operation state of the engine and various pieces of control information transmitted via the communication bus 150. For example, on the basis of an intake air amount, a throttle position, an engine coolant temperature, an intake air temperature, an air-fuel ratio, a crank angle, an accelerator position, and other vehicle information, the engine control device 40 performs engine control which mainly includes fuel injection control, ignition timing control, and opening control for an electronic control throttle valve.

On the basis of a signal transmitted from various sensors for detecting a transmission shift position or a vehicle speed, and various pieces of control information transmitted via the communication bus 150, the transmission control device 50 controls hydraulic pressure supplied to an automatic transmission (not illustrated), and controls the automatic transmission in accordance with preset transmission characteristics.

For example, on the basis of other vehicle information relating to a brake switch, a wheel speed of a four-wheel vehicle, a steering wheel angle, and a yaw rate, the brake control device 60 controls a brake device (not illustrated) of the four-wheel vehicle, independently of a driver's brake operation. In addition, on the basis of a braking force of each wheel, the brake control device 60 calculates brake hydraulic pressure of each wheel, and performs antilock brake system control or sideslip prevention control.

For example, on the basis of other vehicle information relating to a vehicle speed, a driver's steering torque, a steering wheel angle, and a yaw rate, the steering control device 70 controls assist torque generated by an electric power steering motor (not illustrated) installed in a vehicle steering system. In addition, in accordance with an instruction output from the traveling control apparatus 100, the steering control device 70 performs control the electric power steering motor so as to be driven using a steering amount required for following a travel locus of the preceding vehicle, when the host vehicle travels to follow the preceding vehicle traveling ahead of the host vehicle.

Next, the traveling control apparatus 100 functioning as the center of the travel control system 10 will be described. On the basis of a result of the external environment recognized by the external environment recognition device 20, the traveling control apparatus 100 performs travel control on the host vehicle to travel on an ongoing route along a travel lane, and following travel control on the host vehicle to travel so as to follow the preceding vehicle. The travel control is performed by a control unit 101 which is a primary unit of the traveling control apparatus 100.

Specifically, in a case where the control unit 101 does not trace the preceding vehicle traveling ahead of the host vehicle, the control unit 101 recognizes lane lines on a road, detects a travel lane of the host vehicle, and sets an ongoing route along the travel lane. Then, the control unit 101 performs the travel control via the engine control device 40, the transmission control device 50, the brake control device 60, and the steering control device 70 so that the host vehicle travels on the ongoing route at a set vehicle speed.

On the other hand, in a case where the control unit 101 traces the preceding vehicle traveling ahead of the host vehicle, the control unit 101 performs the travel control via the engine control device 40, the transmission control device 50, the brake control device 60, and the steering control device 70 so that the host vehicle travels on the ongoing route at the set vehicle speed while maintaining a predetermined inter-vehicle distance from the preceding vehicle. In addition, when the host vehicle travels slowly in a traffic jam, the control unit 101 performs the following travel control in which the host vehicle travels to follow the preceding vehicle.

In the following travel to follow the preceding vehicle, the control unit 101 calculates the travel locus of the preceding vehicle, and performs steering control via the steering control device 70 so as to coincide with the travel locus. The control unit 101 performs travel driving control via the engine control device 40, the transmission control device 50, and the brake control device 60. In this case, in the following travel control for following the preceding vehicle, a setting position in the vehicle width direction in a rear area of the preceding vehicle is normally set as a control target point. A steering angle is corrected so that a lateral position inside the lane of the host vehicle coincides with the control target point. In this manner, the control unit 101 performs control for determining a travel direction of the host vehicle. A position of the preceding vehicle which is set as the control target point is basically a center position in the vehicle width direction in the rear area of the preceding vehicle.

For example, in order to calculate the travel locus of the preceding vehicle, candidate points for each frame at the position of the preceding vehicle are obtained, on the basis of a movement amount of the host vehicle per one frame of the image captured by the camera 1. A curve which approximates to a point group of the candidate points is calculated as the travel locus of the preceding vehicle. In order to indicate the position of the preceding vehicle, the center position in the rear area of the preceding vehicle is obtained from the image captured by the camera 1. The center position is set to the candidate point indicating the position of the preceding vehicle.

Figure 2:
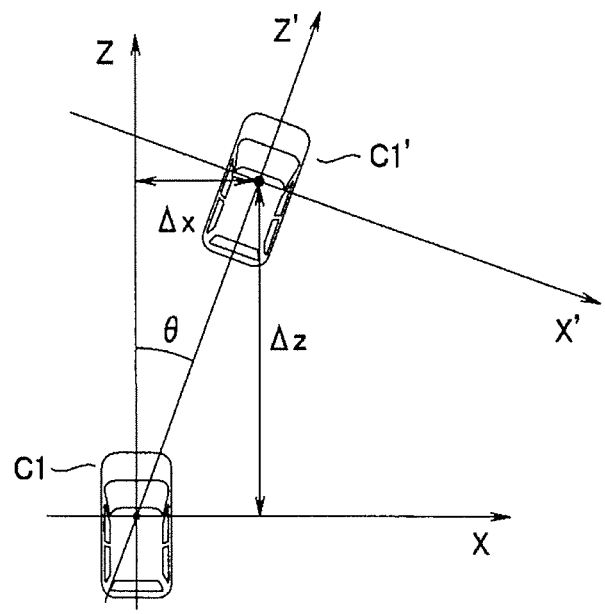
FIG. 2 is a view for illustrating a vehicle movement amount.

Specifically, referring to a relationship illustrated in FIG. 2, on the basis of a vehicle speed V of a host vehicle C1 and a yaw angle θ obtained from a yaw rate of the host vehicle C1, movement amounts Δx and Δz to a host vehicle C1' at frame rate Δt (period until the captured image is updated one frame) are calculated using Equation (1) and Equation (2) below.

$$\Delta x = V^* \Delta t^* \sin \theta \quad (1)$$

$$\Delta z = V^* \Delta t^* \cos \theta \quad (2)$$

Next, as expressed in Equation (3) and Equation (4) below, the movement amounts Δx and Δz of the host vehicle are subtracted from candidate points Pold (Xold and Zold) of the preceding vehicle which are detected prior to the previous frame. Thereafter, the result is coordinate-transformed to a vehicle fixed coordinate system (X' and Z') in the current frame. In this manner, each coordinate of candidate points Ppre (Xpre and Zpre) of the preceding vehicle in the current frame is calculated.

$$X\text{pre}=(X\text{old}-\Delta x)^* \cos \theta - (Z\text{old}-\Delta z)^* \sin \theta \quad (3)$$

$$Z\text{pre}=(X\text{old}-\Delta x)^* \sin \theta + (Z\text{old}-\Delta z)^* \cos \theta \quad (4)$$

Figure 3:
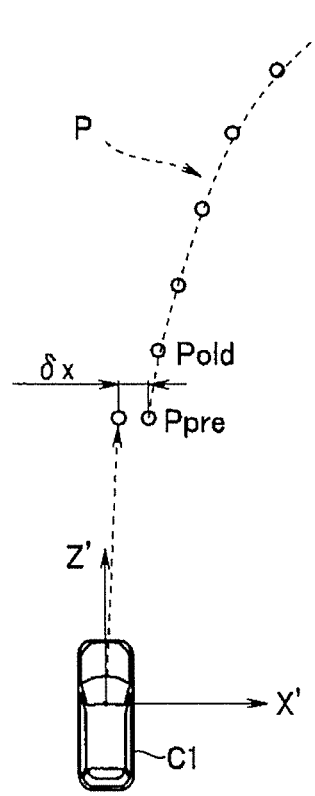
FIG. 3 is a view for illustrating a travel locus of a preceding vehicle.

Then, for example, the least-squares method is applied to the point group of the candidate points so as to obtain a curve as expressed in Equation (5) below. This curve is set to a travel locus P of the preceding vehicle (refer to FIG. 3). In Equation (5), a coefficient K1 represents a curvature component of the travel locus, a coefficient K2 represents a yaw angle component of the travel locus (slope component of the travel locus with respect to the host vehicle), and a coefficient K3 represents a lateral position component of the travel locus with respect to the host vehicle.

$$P=K1^*Z^2+K2^*Z+K3 \quad (5)$$

Figure 4:
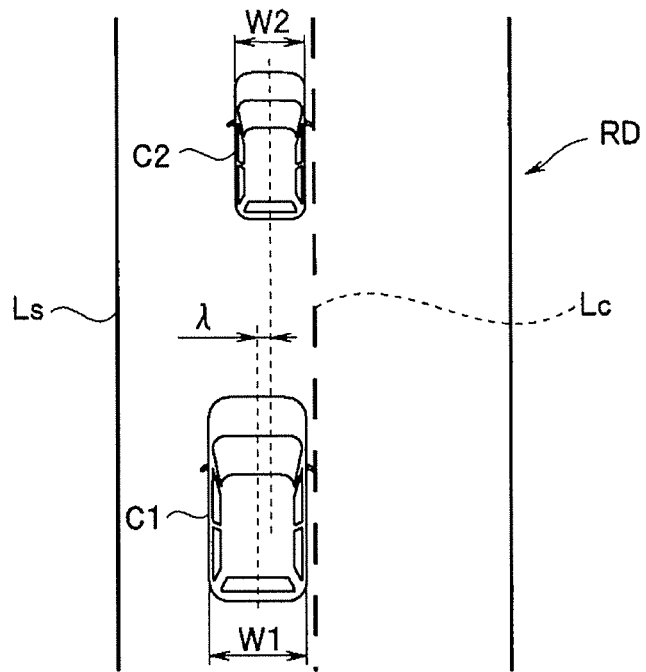
FIG. 4 is a view for illustrating a traveling state of a host vehicle in a case where the preceding vehicle travels close to a road center.
Figure 5:
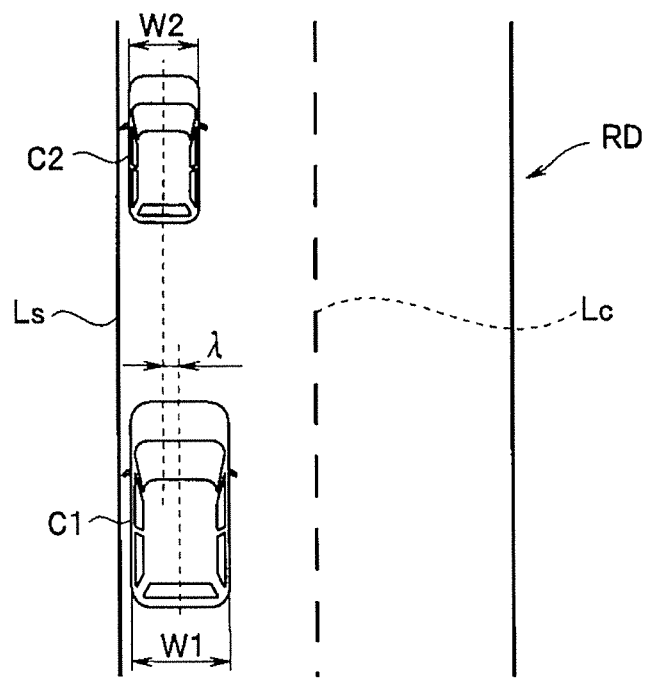
FIG. 5 is a view for illustrating a traveling state of the host vehicle in a case where the preceding vehicle travels close to a road shoulder.

As described above, in order to perform the control for following the travel locus of the preceding vehicle, the control unit 101 controls the steering angle of the host vehicle by setting the center position in the vehicle width direction in the rear area of the preceding vehicle, as the control target point. Therefore, as illustrated in FIG. 4, in a case where the preceding vehicle C2 travels close to the lane (lane line) Lc at the center of the road RD, or conversely in a case where the preceding vehicle C2 travels close to the lane Ls on the road shoulder side of the road RD as illustrated in FIG. 5, according to the following travel control in the related art, the host vehicle C1 also biasedly travels while copying biased travel of the preceding vehicle C2. In a case where a vehicle width W1 of the host vehicle C1 is larger than a vehicle width W2 of the preceding vehicle C2, there is a possibility that the vehicle body of the host vehicle C1 may partially protrude into the lane.

In order to cope with this biased travel of the preceding vehicle, during the following travel control, the traveling control apparatus 100 shifts the lateral position in the ongoing route of the host vehicle, on the basis of the lateral position and the vehicle width inside the lane of the preceding vehicle. In this manner, the traveling control apparatus 100 ensures safety by preventing the host vehicle from protruding out from the lane. Therefore, as illustrated in FIG. 1, in addition to the control unit 101 serving as a primary functional unit, the traveling control apparatus 100 includes a preceding vehicle biased travel determination unit 102, a vehicle width comparison unit 103, and a control target point setting unit 104.

The preceding vehicle biased travel determination unit 102 obtains the lateral position inside the lane of the preceding vehicle with respect to the lane (lane line) recognized from the image captured by the camera 1, and determines whether the preceding vehicle biasedly travels close to any one of the right and left lane lines. Specifically, the preceding vehicle biased travel determination unit 102 determines whether the preceding vehicle travels while a setting range set at the lane center (center of the right and left lane lines) protrudes to any one side of the right and left lane lines.

The setting range at the lane center is a dead zone. In a case where the lateral position of the preceding vehicle is located in the dead zone, the preceding vehicle biased travel determination unit 102 determines that the preceding vehicle does not biasedly travel. In a case where the lateral position of the preceding vehicle deviates from the dead zone, the preceding vehicle biased travel determination unit 102 determines that the preceding vehicle biasedly travels. Then, the preceding vehicle biased travel determination unit 102 transmits a result of determining the biased travel of the preceding vehicle, a direction deviating from the setting range (dead zone), and the amount deviated from the lane center at the lateral position of the preceding vehicle, to the control target point setting unit 104.

The vehicle width comparison unit 103 calculates a difference between a right end position and a left end position in the X-axis direction in the rear area of the preceding vehicle, as the vehicle width W2 of the preceding vehicle, and compares the vehicle width W2 with the vehicle width W1 of the host vehicle. Then, the vehicle width comparison unit 103 adds data relating to a difference between the vehicle widths of both vehicles to a result of comparing the vehicle width W2 of the preceding vehicle and the vehicle width W1 of the host vehicle with each other, and transmits the added data to the control target point setting unit 104. In this example of the invention, as will be described below, only in a case of W2<W1, that is, only in a case where the vehicle width of the host vehicle is larger than the vehicle width of the preceding vehicle, the control target point setting unit 104 shifts the control target point from the center position in the vehicle width direction of the preceding vehicle.

On the basis of the biased travel determination result obtained by the preceding vehicle biased travel determination unit 102 and the vehicle width comparison result obtained by the vehicle width comparison unit 103, the control target point setting unit 104 sets the control target point for the steering control in the following travel, and transmits the control target point to the control unit 101. In a case where it is determined that the preceding vehicle does not biasedly travel, or in a case where the vehicle width of the host vehicle is equal to or smaller than the vehicle width of the preceding vehicle, the control target point setting unit 104 sets the center position in the vehicle width direction in the rear area of the preceding vehicle (intermediate point of the vehicle width W2 of the preceding vehicle), as the control target point.

On the other hand, in a case where the preceding vehicle biasedly travels deviating from the setting range at the lane center, and in a case where the vehicle width of the host vehicle is larger than the vehicle width of the preceding vehicle, the control target point setting unit 104 shifts the control target point as much as a shift amount λ from the center position in the vehicle width direction of the preceding vehicle, in a direction opposite to the direction in which the preceding vehicle deviates from the setting range.

In an example illustrated in FIG. 4, the control target point is set to a position shifted as much as the shift amount λ from the center position in the vehicle width direction in the rear area of the preceding vehicle C2, in the direction opposite to the road center side to which the preceding vehicle is biased. This prevents the host vehicle C1 from protruding to the opposite lane side. In addition, in an example illustrated in FIG. 5, the control target point is set to a position shifted as much as the shift amount λ, in the direction to the road center side opposite to the road shoulder side to which the preceding vehicle is biased. This prevents the host vehicle C1 from protruding to the road shoulder side.

Figure 6:
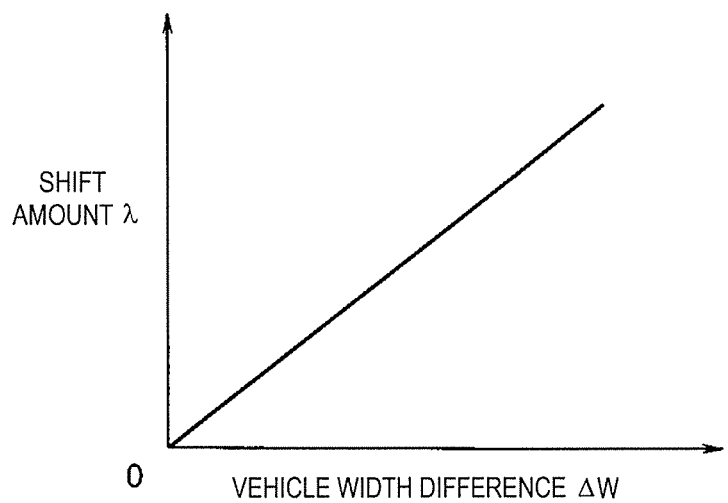
FIG. 6 is a view for illustrating a relationship between a vehicle width difference and the shift amount.

In this case, the shift amount λ may be a preset constant value. Alternatively, the shift amount λ may be set, on the basis of a vehicle width difference ΔW between the vehicle width W1 of the host vehicle and the vehicle width W2 of the preceding vehicle. For example, as illustrated in FIG. 6, a relationship between the vehicle width difference ΔW and the shift amount λ is illustrated using a map. With reference to this map, the shift amount λ is set. In the map illustrated in FIG. 6, as the vehicle width of the host vehicle becomes larger than the vehicle width of the preceding vehicle, the risk that the host vehicle may protrudes from the lane increases. Accordingly, the setting is made using a characteristic that the shift amount λ increases as the vehicle width difference ΔW (ΔW=W1−W2: W1>W2) increases.

Figure 7:
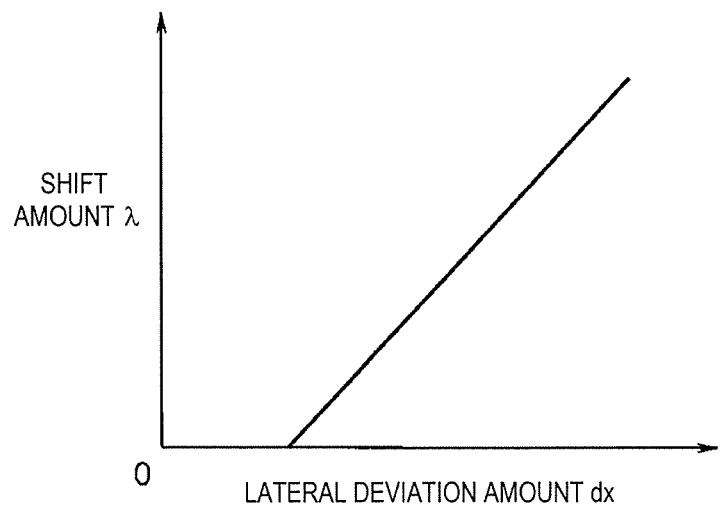
FIG. 7 is a view for illustrating a relationship between a lateral position and a shift amount of the preceding vehicle.

In addition, the shift amount λ may be set, on the basis of a lateral deviation amount dx from the lane center at the lateral position inside the lane of the preceding vehicle. In a case where the vehicle width of the host vehicle is larger than the vehicle width of the preceding vehicle, as the lateral deviation amount dx from the lane center of the preceding vehicle increases, the risk that the host vehicle may protrudes from the lane increases. Therefore, as illustrated in FIG. 7, a map is prepared which has a characteristic that the shift amount λ increases as the lateral deviation amount dx increases. With reference to this map, the shift amount λ is set. In FIG. 7, a region of the lateral deviation amount dx where λ=0 is satisfied is a region corresponding to the dead zone (half).

In the example according to an aspect of the invention, in a case where the vehicle width of the preceding vehicle is equal to or larger than the vehicle width of the host vehicle, without depending on the determination result of the preceding vehicle biased travel determination unit 102, the center position in the vehicle width direction of the preceding vehicle is set as the control target point. However, a configuration is not limited thereto. On the basis of the result of determining whether the preceding vehicle biasedly travels, without depending on a vehicle width difference between the preceding vehicle and the host vehicle, the control target point may be shifted.

Here, the control target point in the following travel control is shifted, on the basis of the recognition result of the lane (lane line). However, in some cases, although the preceding vehicle can be recognized, the lane line on the road cannot be recognized due to a change in environmental conditions such as rainfall, snowfall, and fog. In addition, in some cases, the lane line is absent on the road itself. In this case, the traveling control apparatus 100 shifts the control target point by using the lane width stored immediately before the traveling control apparatus 100 cannot recognize the lane line, or the map information input from the map information processing device 30.

Figure 8:
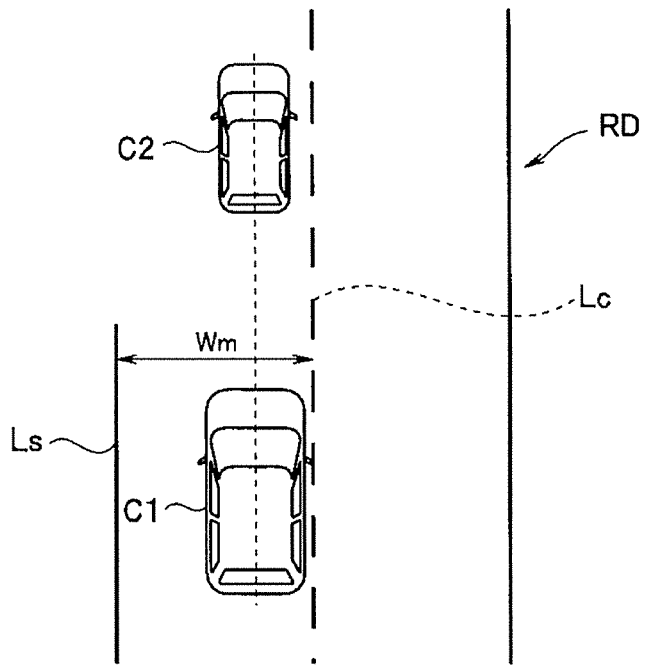
FIG. 8 is a view for illustrating a lateral position shift of the host vehicle in a case where the host vehicle cannot recognize one side of a lane.

For example, a memory inside the traveling control apparatus 100 is caused to store a lane width Wm of the lane recognized by the external environment recognition device 20 so as to update the lane width Wm. Then, as illustrated in FIG. 8, in a case where the lane line Ls on one side cannot be recognized, the lane width Wm stored immediately before the lane line Ls on one side cannot be recognized is read out from the memory, and the lateral position of the preceding vehicle C2 is estimated with reference to the lane line Lc on a recognizable side, thereby determining the shift amount of the control target point. In this case, instead of the lane width Wm stored in the memory, a lane width in the road shape data acquired from the map information processing device 30 may be used.

Figure 9:
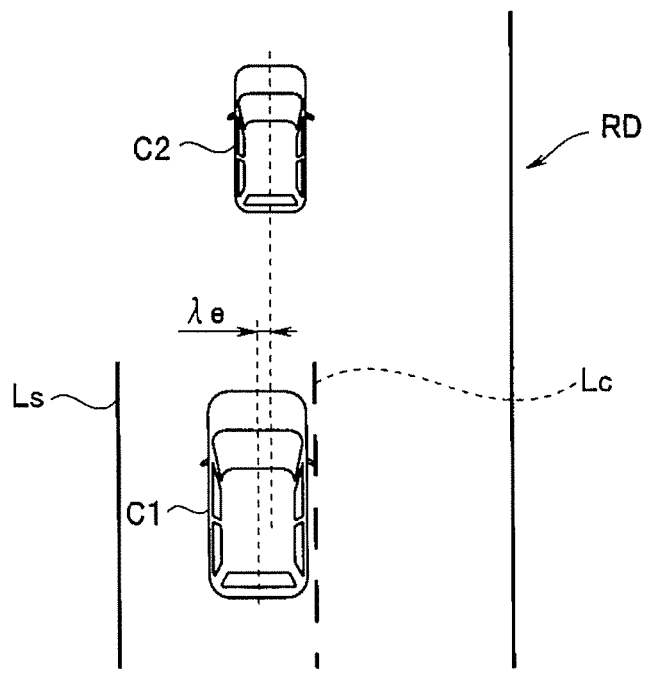
FIG. 9 is a view for illustrating a lateral position shift of the host vehicle in a case where the host vehicle cannot recognize both sides of the lane.

Furthermore, in a state where the lane lines on both sides cannot be recognized, and in a state where the map information cannot be acquired from the map information processing device 30, as illustrated in FIG. 9, the control target point is shifted as much as a setting amount λe in the direction to the road shoulder without depending on the lateral position of the preceding vehicle C2. For example, the setting amount λe for shift is determined, on the basis of the vehicle width difference ΔW between the host vehicle C1 and the preceding vehicle C2. The host vehicle C1 is shifted as much as the determined setting amount in the direction to the road shoulder. In this manner, even in a case where the preceding vehicle C2 biasedly travels close to the lane line Lc at the road center, the host vehicle C1 can avoid in advance biasedly traveling close to the road center and protruding into the opposite lane while copying the preceding vehicle C2. Therefore, safety can be ensured.

The control unit 101 corrects the current steering angle via the steering control device 70 so that the center position in the vehicle width direction of the host vehicle coincides with the control target point, and controls the following travel to follow the preceding vehicle. The steering control for the control target point is performed by performing mainly feedback control on the basis of a deviation δx between the position of the host vehicle and the control target point when the host vehicle progressively travels using the current steering angle.

For example, as expressed by Equation (6) below, a feedforward amount on the basis of a curvature K1 of the travel locus of the preceding vehicle and a feedback amount of a deviation δyaw for allowing a yaw angle of the host vehicle to coincide with a yaw angle component K2 of the travel locus are added to the steering amount based on the deviation δx between the position of the host vehicle and the control target point so as to calculate a target steering angle αref. The electric power steering motor is controlled to be driven using a target steering torque which realizes the target steering angle αref.

$$\alpha ref = G1*\delta x + Gff*K1 + GY*\delta yaw \quad (6)$$

Figure 10:
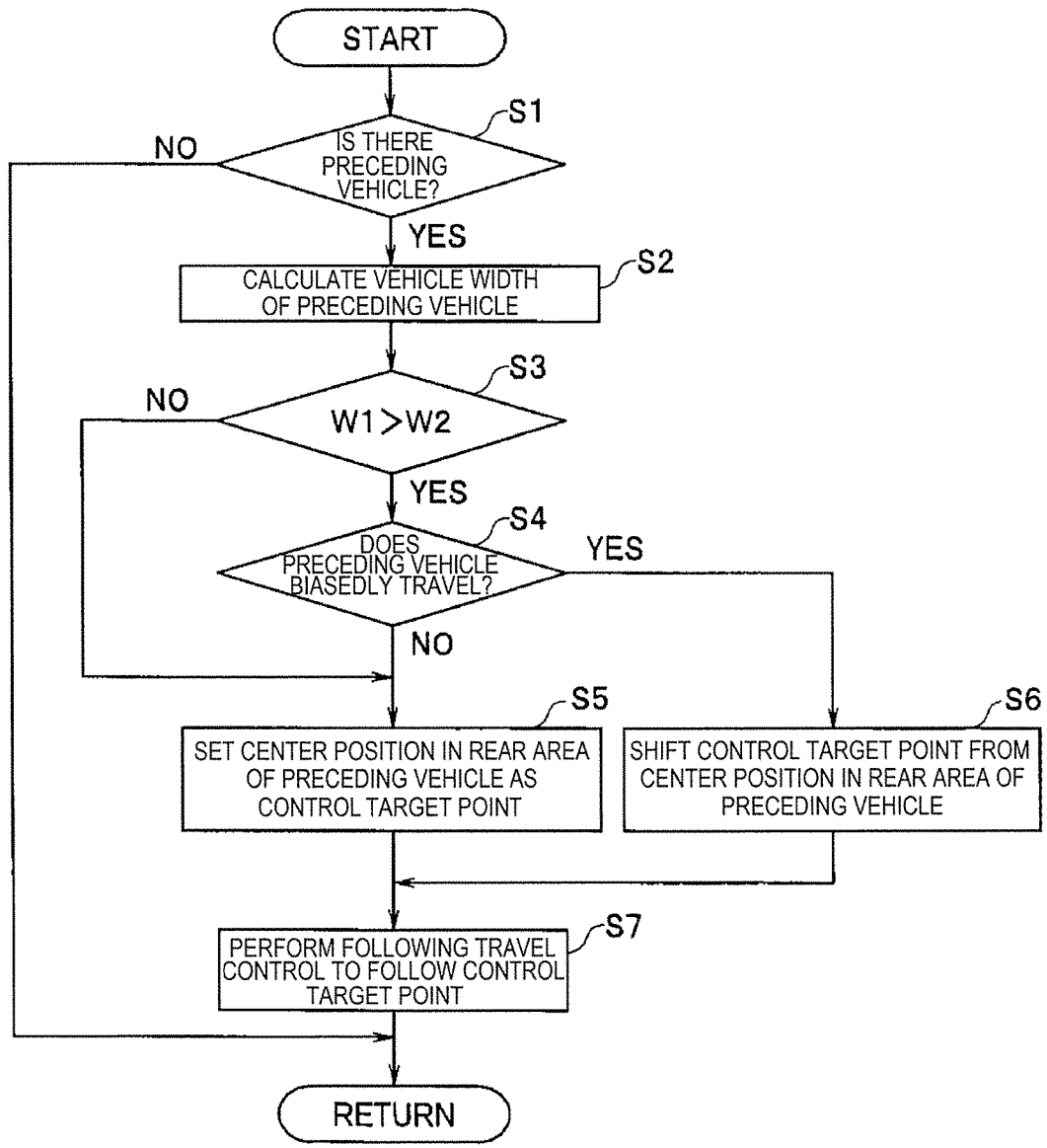
FIG. 10 is a flowchart of following travel control.
Figure 11:
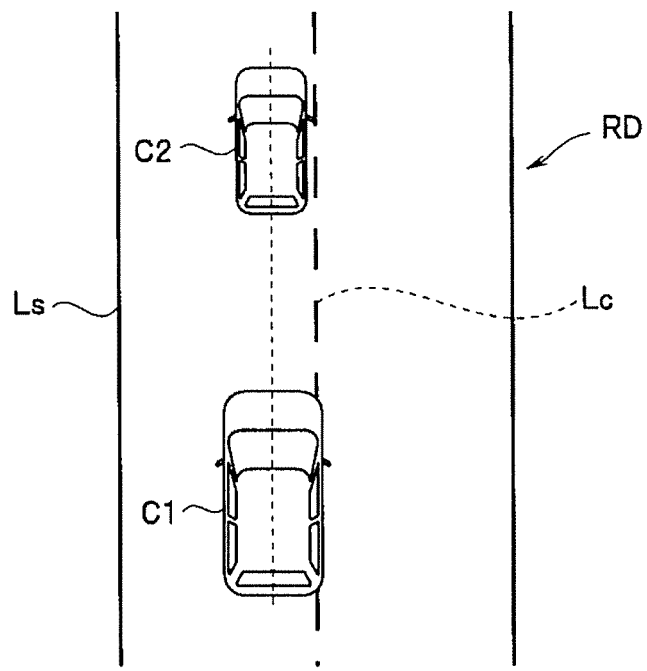
FIG. 11 is a view for illustrating a traveling state of a host vehicle in a case where a preceding vehicle travels close to a road center in following travel in the related art.
Figure 12:
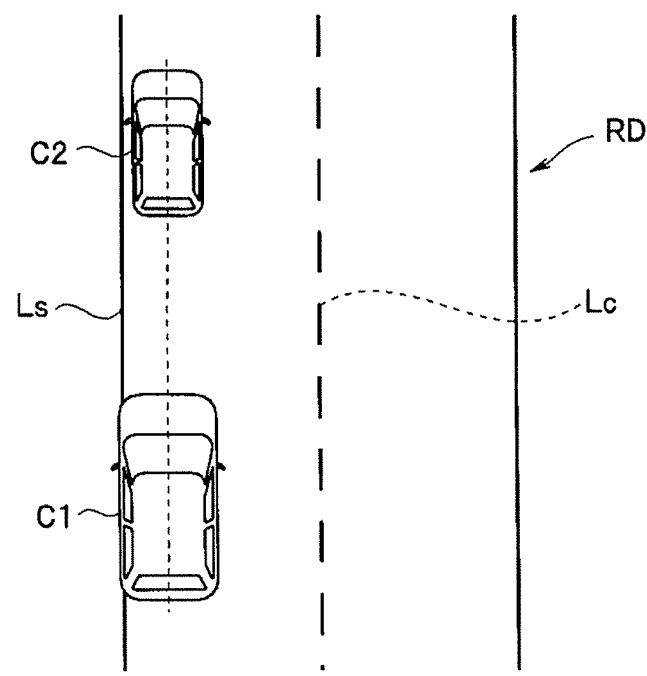
FIG. 12 is a view for illustrating a traveling state of the host vehicle in a case where the preceding vehicle travels close to a road shoulder in the following travel in the related art.

However, G1: Feedback gain for the deviation between the position of the host vehicle and the control target point when the host vehicle progressively travels using the current steering angle Gff: Feedforward gain for the curvature of the travel locus Gy: Feedback gain for a relative yaw angle between the travel locus and the host vehicle Next, a program process for the following travel control to follow the preceding vehicle in the traveling control apparatus 100 will be described with reference to a flowchart in FIG. 10.

In the following travel control to follow the preceding vehicle, in initial Step S1, the traveling control apparatus 100 checks whether a recognized preceding vehicle is present within a predetermined range ahead of the host vehicle. Then, in a case where the preceding vehicle is not recognized, the traveling control apparatus 100 does not perform this process. In a case where the preceding vehicle is recognized, the process proceeds to Step S2 so as to calculate the vehicle width W2 of the preceding vehicle.

Next, the process proceeds to Step S3 so as to compare the vehicle width W1 of the host vehicle which is previously stored in the device, with the vehicle width W2 of the preceding vehicle which is calculated in Step S2. Then, in a case where the vehicle width W1 of the host vehicle is larger than the vehicle width W2 of the preceding vehicle (W1>W2), the process proceeds from Step S3 to Step S4. In a case where the vehicle width W1 of the host vehicle is equal to or smaller than the vehicle width W2 of the preceding vehicle (W1≤W2), the process proceeds from Step S3 to Step S5.

In Step S4, the traveling control apparatus 100 determines whether the preceding vehicle biasedly travels deviating from the setting range at the lane center. As a result, in a case where it is determined that the preceding vehicle does not biasedly travel, the process proceeds from Step S4 to Step S5 so as to set the center position in the rear area of the preceding vehicle as the control target point of the following travel to follow the preceding vehicle.

On the other hand, in a case where it is determined that the preceding vehicle biasedly travels, the process proceeds from Step S4 to Step S6 so as to set the control target point at the position shifted as much as a predetermined amount from the center position in the rear area of the preceding vehicle. As described above, the shift amount λ at this time can be set using a preset constant value, the vehicle width difference ΔW between the vehicle width W1 of the host vehicle and the vehicle width W2 of the preceding vehicle, and the lateral deviation amount dx from the lane center at the lateral position inside the lane of the preceding vehicle.

Thereafter, the process proceeds from Step S5 or Step S6 to Step S7 so as to perform the following travel control so that the center position in the vehicle width direction of the host vehicle coincides with the control target point. This following travel control is performed by performing mainly the steering control for correcting the current steering angle, based on the deviation between the control target point and the center position of the host vehicle. In this manner, the host vehicle is prevented from protruding from the lane by restraining the host vehicle from biasedly traveling while copying the biased travel of the preceding vehicle.

In this way, in the example according to an aspect of the invention, when the host vehicle performs the following travel in accordance with the setting position in the vehicle width direction of the preceding vehicle as the control target point, in a case where the preceding vehicle biasedly travels deviating from the setting range at the lane center, the control target point is shifted in the direction opposite to the direction in which the preceding vehicle deviates from the setting range. In this manner, the host vehicle is restrained from biasedly traveling while copying the biased travel of the preceding vehicle. Without giving anxiety to a driver, it is possible to ensure safety by preventing the host vehicle from protruding from the lane.

The invention claimed is:

1. A vehicle traveling control system comprising:
    one or more sensors configured to acquire external environment information of a host vehicle, the host vehicle traveling in a traveling lane following a preceding vehicle; and
    a vehicle traveling control apparatus configured to:
        determine whether the preceding vehicle deviates from a lane center of the traveling lane based on the external environment information;
        responsive to determining that the preceding vehicle does not deviate from the lane center, set a mid-point of a width of the preceding vehicle as a control target point;
        responsive to determining that the preceding vehicle deviates from the lane center:
            1) calculate a shift amount based on a difference between the width of the preceding vehicle and a width of the host vehicle, wherein the shift amount increases according to an increase in the difference between the width of the preceding vehicle and the width of the host vehicle; and
            2) set, as the control target point, a position shifted from the mid-point of the preceding vehicle by the calculated shift amount in a direction opposite a direction in which the preceding vehicle deviates from the lane center; and
        execute a following travel control of the host vehicle for following the preceding vehicle based on the control target point.

2. The vehicle traveling control system according to claim 1, wherein determining whether the preceding vehicle deviates from the lane center of the traveling lane comprising:
   calculating a lateral position of the preceding vehicle within the traveling lane; and
   determining whether the lateral position of the preceding vehicle deviates from a predetermined range set along a center of the traveling lane within the traveling lane.

3. The vehicle traveling control system according to claim 1, wherein the shift amount is calculated based further on a deviation amount that the mid-point of the preceding vehicle deviates from the lane center of the traveling lane.

4. The vehicle traveling control system according to claim 1, wherein the vehicle traveling control apparatus is configured to determine that the width of the preceding vehicle is equal to or larger than the width of the host vehicle based on the external environment information, and
   wherein the mid-point of the width of the preceding vehicle is set as the control target point based on determining that the width of the preceding vehicle is equal to or larger than the width of the host vehicle regardless the determination that the preceding vehicle deviates from the center of the traveling lane.

5. The vehicle traveling control system according to claim 2, wherein the vehicle traveling control apparatus is configured to determine that the width of the preceding vehicle is equal to or larger than the width of the host vehicle based on the external environment information, and
   wherein the mid-point of the width of the preceding vehicle is set as the control target point based on determining that the width of the preceding vehicle is equal to or larger than the width of the host vehicle regardless the determination that the preceding vehicle deviates from the center of the traveling lane.

6. The vehicle traveling control system according to claim 3, wherein the vehicle traveling control apparatus is configured to determine that the width of the preceding vehicle is equal to or larger than the width of the host vehicle based on the external environment information, and
   wherein the mid-point of the width of the preceding vehicle is set as the control target point based on determining that the width of the preceding vehicle is equal to or larger than the width of the host vehicle regardless the determination that the preceding vehicle deviates from the center of the traveling lane.

7. The vehicle traveling control system according to claim 2, wherein when one side of the traveling lane is not recognized while the host vehicle travels in the traveling lane following the preceding vehicle, the vehicle traveling control apparatus estimates the lateral position of the preceding vehicle based on a lane width of the traveling lane recognized immediately before the recognition of the one side of the traveling lane ended.

8. The vehicle traveling control system according to claim 1, wherein when the traveling lane is not recognized while the host vehicle travels in the traveling lane following the preceding vehicle, the lateral position of the preceding vehicle in the traveling lane is estimated based on map information of traveling lane on which the preceding vehicle and the host vehicle are traveling.

* * * * *